(12) United States Patent
Beteille

(10) Patent No.: US 7,531,101 B2
(45) Date of Patent: May 12, 2009

(54) METHOD FOR ELIMINATING PUNCTUAL DEFECTS COMPRISED IN AN ELECTROCHEMICAL DEVICE

(75) Inventor: Fabien Beteille, Revel (FR)

(73) Assignee: Saint-Gobain Glass France, Courbevoie (FR)

(*) Notice: Subject to any disclaimer, the term of this patent is extended or adjusted under 35 U.S.C. 154(b) by 274 days.

(21) Appl. No.: 10/530,285

(22) PCT Filed: Oct. 1, 2003

(86) PCT No.: PCT/FR03/02871

§ 371 (c)(1),
(2), (4) Date: Oct. 6, 2006

(87) PCT Pub. No.: WO2004/034138

PCT Pub. Date: Apr. 22, 2004

(65) Prior Publication Data

US 2007/0141360 A1    Jun. 21, 2007

(30) Foreign Application Priority Data

Oct. 9, 2002    (FR) .................................. 02 12520

(51) Int. Cl.
*C03C 15/00*    (2006.01)

(52) U.S. Cl. ............................. 216/33; 216/59; 216/65
(58) Field of Classification Search .................. 216/33, 216/59, 65
See application file for complete search history.

(56) References Cited

U.S. PATENT DOCUMENTS

| | | | | |
|---|---|---|---|---|
| 6,337,758 | B1 * | 1/2002 | Beteille et al. | 359/265 |
| 7,027,155 | B2 * | 4/2006 | Cordingley et al. | 356/401 |
| 2002/0046998 | A1 * | 4/2002 | Hackel et al. | 219/121.83 |
| 2003/0111447 | A1 * | 6/2003 | Corkum et al. | 219/121.69 |

FOREIGN PATENT DOCUMENTS

| | | |
|---|---|---|
| FR | 2 781 084 | 1/2000 |
| WO | WO 00 03289 A1 * | 1/2000 |

* cited by examiner

*Primary Examiner*—Binh X Tran
(74) *Attorney, Agent, or Firm*—Oblon, Spivak, McClelland, Maier & Neustadt, P.C.

(57) ABSTRACT

A method of eliminating, using a beam of laser radiation, defects lying within a laminate formed from at least a first substrate and from at least a second substrate. The laminate incorporates, between the first and second substrates, at least one smart active system. The method locates at least one defect lying within the active system and ablates the defect, by circumscribing the defect using a laser beam.

12 Claims, 2 Drawing Sheets

METHOD FOR ELIMINATING PUNCTUAL DEFECTS COMPRISED IN AN ELECTROCHEMICAL DEVICE

CROSS-REFERENCE TO RELATED APPLICATIONS

The present application is the U.S. counterpart of WO 2004/034138 and in turn claims priority to French Application No. 02/12520 filed on Oct. 9, 2002, the entire contents of each of which are hereby incorporated herein by reference.

FIELD OF THE INVENTION

The subject of the present invention is a method of eliminating point defects likely to be present within an electrochemical device, especially an electrically controllable system of the glazing type with variable optical and/or energy properties, within a photovoltaic device or within an electroluminescent device.

More precisely, the aim of the invention is to provide a method of eliminating defects that are likely to occur at an advanced stage in the manufacture of the device, especially at a stage when the market value of the device is high.

DISCUSSION OF THE BACKGROUND

Despite the care taken during the manufacture of these devices (work in clean rooms, pulsed supply for the film-deposition cathodes, vertical deposition line, high-quality substrates), it may happen that surface defects usually called "pinholes" do appear. These pinholes can arise in many ways. They may arise from environmental dust particles that have not been retained and/or removed by the means for filtering the atmosphere of the treatment chambers or from residues emanating from the devices that have to deposit the various layers according to the active (electrochromic, photovoltaic, electroluminescent, etc.) systems, especially at the targets, or else poor quality of the substrate. These defects are unacceptable as they may cause, by coming into contact with the electrodes, permanent deterioration of the functionality of these glazing assemblies.

Because of the financial loss that may be engendered by scrapping a device containing a few defects, it has been endeavored to eliminate these defects, especially at an advanced stage in the manufacturing process.

A first technique aiming to eliminate surface defects consists, after having visually detected defects present in the form of an aureole, in ablating the constituent material of the layer at the aureole using a scratching device of the cutter or equivalent type.

This first technique does allow effective elimination of the defects, but they can be ablated only when the layers of the active system are still accessible, that is to say, in the case of a laminated windshield, before the step of laying down the sheet interlayer and before joining the substrates together, which further reduces the field of application of this technique (it is inoperable when the substrate and the active system have been fully assembled, the layers of the active system being inaccessible).

A second technique is known for ablating the layers of an active system that uses laser radiation. This second technique is conventional in the field of marginating layers and makes it possible, by laser radiation, to remove around the periphery of a glass substrate, for example, layers with silver in order to prevent corrosion phenomena occurring throughout the active system, or to limit leakage current phenomena in the case of an active system of the electrochromic or photovoltaic type.

This second technique is very effective for eliminating part or all of the layers forming an active system (the material of the layers being completely or partially destroyed by the laser).

In addition, the margination technique is a method limited to ablating just the layers around the periphery of the substrate, that is to say in a place where removal of the destroyed material is easy. It will be readily understood that it is impossible to operate through a laminated substrate, since the material destroyed by the laser radiation must not remain trapped between the two substrates forming the laminate.

The inventors have quite unexpectedly discovered that, by adapting the laser radiation operating conditions, it is possible to use this type of radiation to destroy layers of an active system even when they are not located around the periphery of a laminated substrate.

The method forming the subject of the invention is particularly intended for what is called "smart" glazing, which is capable of adapting to the user requirements.

As regards smart glazing, this may be used to control the amount of sunlight passing through the windows mounted on the outside of buildings or of vehicles of the automobile, train or plane type. The aim is to be able to limit excessive heating inside passenger compartments/rooms, but only when there is strong sunlight.

It may also involve controlling the degree of vision through windows, especially so as to darken them, make them scattering or even completely prevent vision when this is desirable. This may relate to the windows mounted as interior partitions, in rooms, trains or planes, or mounted as side windows in automobiles. This also relates to mirrors used as rear-view mirrors, to prevent the driver from being dazzled, or indicating panels, so that messages appear when necessary, or intermittently in order to better attract attention. Glazing that may be rendered diffusing at will can be used, when so desired, as projection screens.

Various electrically controllable systems allowing this kind of modification in appearance or in thermal properties are in existence.

To modulate the light transmission or light absorption of glazing, there are so-called viologen based systems, such as those described in patents U.S. Pat. No. 5,239,406 and EP-612 826.

To modulate the light transmission and/or heat transmission of glazing, there are also systems called electrochromic systems. As is known, these generally comprise two layers of electrochromic material separated by an electrolyte layer and flanked by two electrically conducting layers. Each of the layers of electrochromic material can reversibly inject cations and electrons, the change in their oxidation state as a result of these injections/ejections resulting in a change in its optical and/or thermal properties.

There are also systems called "optical valves". These are films comprising a generally crosslinked polymer matrix in which there is dispersed microdroplets containing particles that are capable of lining themselves in a preferential direction under the action of a magnetic or electric field. Thus, patent WO93/09460 discloses an optical valve comprising a polyorganosilane matrix and polyiodide-type particles that intercept light much less when the film is under voltage.

Mention may also be made of what are called electroluminescent systems, which, as is known, generally comprise at least one thin layer of an organic or inorganic electroluminescent material sandwiched between two appropriate electrodes.

It is usual to classify electroluminescent systems into several categories according to whether they are of the organic type, commonly called OLED (Organic Light-Emitting Diode) systems or PLED (Polymer Light-Emitting Diode) systems, or of the inorganic type, and in this case usually called TFEL (Thin Film Electroluminescent) systems.

SUMMARY OF THE INVENTION

The invention may also be applicable in "smart" systems belonging to the family of photovoltaic systems (that convert light energy into electrical energy). An example of a stack of photovoltaic functional layers is, for example, of the Mo/Ga: CIS/CdS/ZnO type or of the Al/a-Si/Al:ZnO type.

The object of the invention is therefore to propose a method of eliminating, using a beam of laser radiation, visible defects lying within a laminate formed from at least a first substrate and from at least a second substrate, said laminate incorporating, between said first and second substrates, at least one "smart" active system as defined above.

The subject of the invention is firstly a method including:
  a phase of locating at least one defect lying within the active system; and
  a phase of ablating the defect, consisting in circumscribing the latter using said laser beam.

By virtue of these provisions, it is possible to repair devices that incorporate active systems, either at an advanced stage in their manufacture, so as to restore their initial market value, or well after their manufacture, for example during a repair following a maintenance operation.

In preferred ways of implementing the invention, one or more of the following provisions may optionally be furthermore employed:
  the defect is circumscribed using a continuous laser beam;
  the defect is circumscribed using a number of laser pulses;
  the phase of locating the defect is carried out by optical means, either manually (human intervention) or automatically using image processing software;
  a phase of pinpointing the defect using at least a first laser beam pulse;
  the pinpointing phase incorporates an intermediate phase of resetting the laser beam according to the deviation between one of said first pulses and the defect;
  the pinpointing phase is carried out using a low power level of the laser beam;
  ablation of the defect consists in moving the laser beam so as to follow approximately the periphery of the defect;
  the wavelength of the laser beam is adapted so that the beam is, on the one hand, absorbed by the layers forming the active system and, on the other hand, transmitted through the substrate;
  ablation of the defect consists in electrically isolating the peripheral region of the defect relative to the active system that includes the defect;
  ablation of the defect is carried out through the first substrate; and
  ablation of the defect is carried out through the second substrate.

BRIEF DESCRIPTION OF THE DRAWINGS

Other features and advantages of the invention will become apparent in the course of the following description of several ways of implementing it, these being given by way of non-limiting example.

DESCRIPTION OF THE PREFERRED EMBODIMENTS

Figure 1:
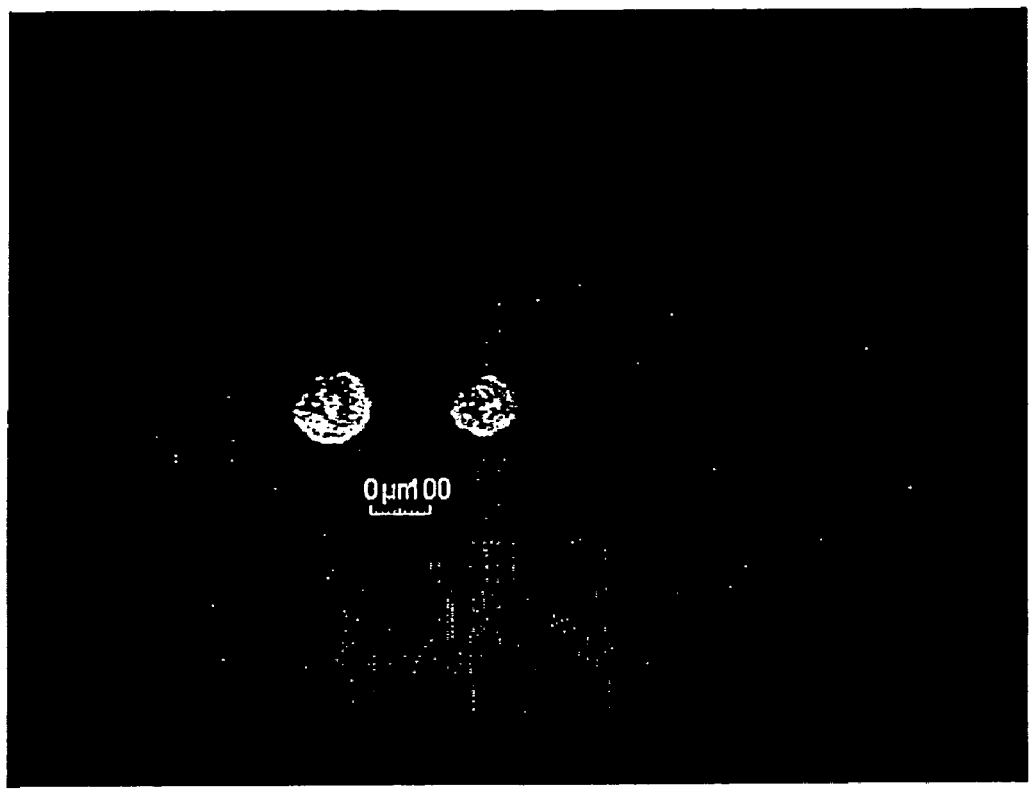
FIG. 1 illustrates a defect that can be removed by the method according to the invention.
Figure 2:
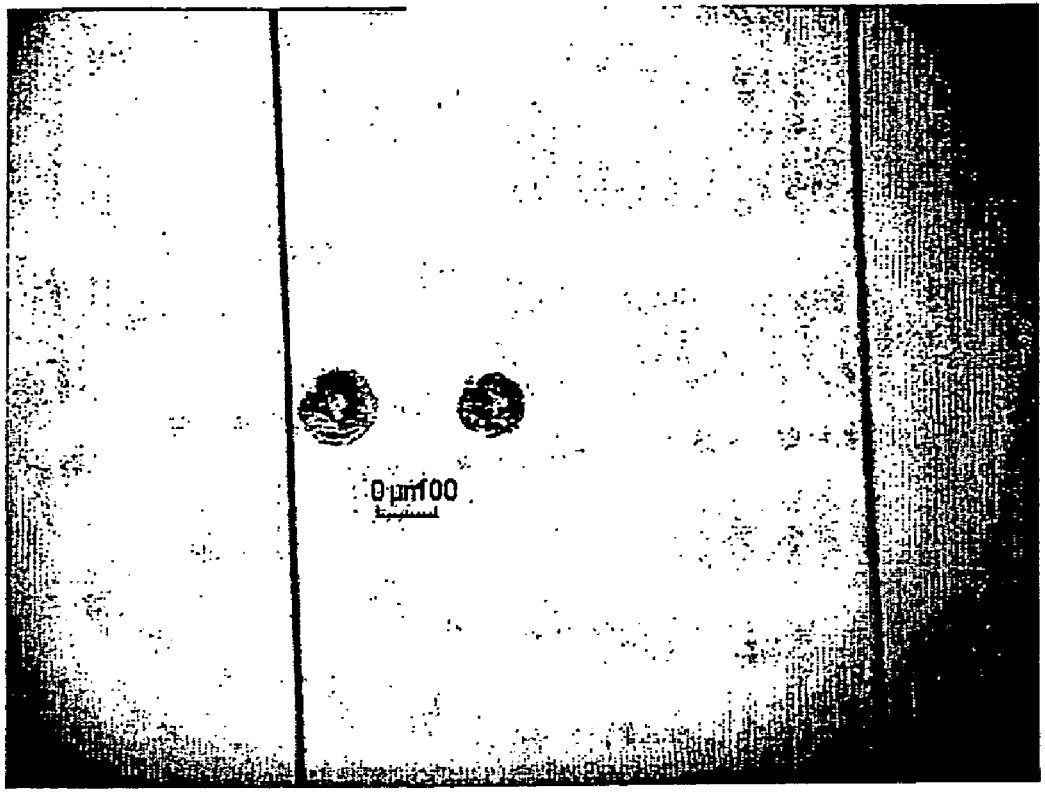
FIG. 2 is similar to FIG. 1, but after elimination of the defect.

The invention applies to glazing in the broad sense: the carrier substrates are generally rigid and transparent, of the glass or polymer type, the polymer being for example polycarbonate or polymethyl methacrylate (PMMA). However, the invention includes polymer-based substrates that are flexible or semiflexible.

These substrates are juxtaposed so as to form a laminate using one or more sheets of thermoplastic polymer of the EVA (ethylene/vinyl acetate), PVB (polyvinyl butyral) or PU (polyurethane) type, the laminating insert joining at least a first substrate to at least a second substrate.

It is also possible to avoid a laminating operation carried out hot, possibly under pressure, by substituting the conventional thermoplastic interlayer sheet with a double-sided adhesive sheet, self-supporting or otherwise, which is commercially available and has the advantage of being very thin.

At least one "smart" active system as defined above, together with electrically conducting layers that form anodes, cathodes and more generally electrodes, are inserted between these first and second substrates, these electrically conducting layers being suitable for being connected via current leads to an electrical current and/or voltage source so as to activate/deactivate the active system.

For the sake of brevity, the term "active stack" or "electroactive stack" denotes the active layer or layers of the system, that is to say all of the layers of the system except for the layers belonging to the electrodes. For example, in the case of an electrochromic system, it is therefore essentially formed from a layer of an anodic electrochromic material, an electrolyte layer and a layer of a cathodic electrochromic material, each of these layers possibly consisting of a monolayer or of a number of superposed layers fulfilling the same function.

In general, each electrode contains an electrically conducting layer or several superposed electrically conducting layers, which hereafter will be considered as a single layer. To power the electrically conducting layer correctly, it is generally necessary to have two current leads placed along the two opposed edges of the layer when the latter has the outline of a rectangle, a square or a similar geometrical shape of the parallelogram type.

An example of an electrically conducting layer is a layer based on a doped metal oxide, especially tin-doped indium oxide called ITO or fluorine-doped tin oxide $F:SnO_2$, optionally deposited on a prelayer of the silicon oxide, oxycarbonide or oxynitride type. It is also possible to include a layer with an optical function and/or alkali-metal barrier function when the substrate is made of glass.

As an example, the current leads for the electrodes may be in the form of a conducting wire (or several conducting wires joined together). These wires may be made of copper, tungsten or graphite-coated tungsten. They may have a diameter ranging from 10 to 600 μm. This type of wire is in fact sufficient for satisfactorily powering the electrodes, and they are remarkably discreet—it may be unnecessary to mask them in assembling the device.

The configuration of the current leads is very adaptable. Approximately rectangular active systems have been described, but they may have many different geometrical shapes, especially according to the geometrical shape of their carrier substrate, namely a circle, square, semicircle, oval, any polygon, diamond, trapezoid, square, any parallelogram, etc. In these situations, the current leads are no longer necessary, for each electrode to be supplied, "pairs" of current leads facing each other. Thus, there may, for example, be current leads that go all around the conducting layer (or at the very least running along a good part of its perimeter), this being achievable when the current lead is a simple conducting wire. There may even be point current leads, especially when the device is small in size.

The device according to the invention may use one or more substrates made of bulk-tinted glass. Advantageously, if the glazing is a laminate, the bulk-tinted glass pane is that one intended to face toward the interior of the room or of the passenger compartment, the outer glass pane being clear. Tinting the glass allows the level of light transmission of the glazing to be adjusted. When placed in the interior side, glazing heat-up by absorption is limited. The glass pane(s) may also be curved—this is especially the case in applications as electrochromic automobile roofs.

The glazing according to the invention may include additional functionalities: it may for example include an infrared-reflecting coating, as described in patent EP-825 478. It may also include a hydrophilic, antireflection or hydrophobic coating or a photocatalytic coating having antifouling properties, comprising titanium oxide in anatase form, as described in patent WO 00/03290.

Such a laminated substrate is likely, despite the great care taken in its manufacture, to include a few defects (pinholes) that the method according to the invention aims to eliminate.

Such visual defects are illustrated in FIG. 1, and are in the form of a visual aureole of bleaching, the characteristic dimensions of which may lie within the range from 0.2 mm to 10 cm approximately. This visual aureole of bleaching is characteristic of defects in electrochromic-type "smart" active systems. This bleached region does not represent the actual size of the defect proper—it is merely the physical consequence of the presence of the defect. This visual defect is manifested by the presence of a leakage current which can be measured. In practice, the defect or pinhole has an actual size of around 20 to 50 µm, but its presence in the active system creates potential well phenomena around the latter, the effects of which are manifested by bleaching substantially centered around the latter, over a much greater area, possibly up to the abovementioned 2 to 100 mm.

After this defect has been located "manually" by the user's eyes, optionally with the assistance of an optical magnifying instrument (camera, optical instrument), or automatically, using a combination of an optical instrument and optical processing software, the laminated substrate is positioned so as to face a laser.

In fact, the wavelength of the laser beam is adapted so as to be able, on the one hand, to pass through the substrate without being absorbed and, on the other hand, to be absorbed by the materials forming the layers of the stack of the active system.

In the case of the example shown in FIG. 1, the active system is of the electrochromic type and the wavelength chosen is about 1.06 µm, the laser used being of the pulsed YAG type.

A continuous laser may also be used. Whatever the type of laser used (pulsed or continuous), the defect is circumscribed using the beam.

The defect is then pinpointed using a train of laser pulses of low power and any shift between the target and the defect is recorded. The measurement of this shift will be incorporated during ablation of the defect.

The actual ablation consists in describing approximately a circle around the defect so as to electrically isolate the effective region of the defect and thus minimize the visual impact of this ablation. The layers forming the stack of the active system are destroyed by pinpointing the laser beam on the defect (taking into account the amount of shift), describing a circle around the latter while pulsing the beam.

As an example, to ablate the defect shown in FIG. 1, the laser beam parameters are the following: 30% of the maximum power; 50 kHz; circle: 0.5 mm radius; beam width: 80 µm; beam travel speed: 5 m/s.

The quality of the laser ablation may be quantified by measuring the leakage current that results from the presence of the defect. In fact, there is a proportionality relationship between the area of the defect, (for an active system, this is a bleached aureole) and the value of the leakage current. Thus, using the method according to the invention, the leakage current may be reduced by a factor of the order of 10 within the core of the margination that surrounds the glazing.

The operating conditions of the laser will be adapted according to the type of stack forming the active system.

Moreover, it is possible to ablate defects in the glass substrate either from the 1 face (that turned toward the outside) or from the 4 face (that turned toward the inside). However, it may be more practical in an unsymmetric configuration (solar-protection layers, tinted glass, etc.) to choose the side for ablation that generates the fewest visual defects and achieves the best ablation of the "active" layers.

The invention claimed is:

1. A method of eliminating, using a laser beam of laser radiation, pinhole defects lying within a laminate formed from at least a first substrate and from at least a second substrate, the laminate incorporating, between the first and second substrates, at least one active system, the method comprising:

locating at least one pinhole defect lying within the active system; and ablating the pinhole defect through at least one of the first or second substrates, by circumscribing the pinhole defect using the laser beam, the ablating the defect electrically isolating a peripheral region of the pinhole defect relative to the active system including the pinhole defect.

2. The method as claimed in claim 1, wherein the pinhole defect is circumscribed using a continuous laser beam.

3. The method as claimed in claim 1, wherein the pinhole defect is circumscribed using a number of laser pulses.

4. The method as claimed in claim 1, wherein the locating the pinhole defect is carried out by an optical mechanism, either manually by human intervention or automatically using image processing software.

5. The method as claimed in claim 1, wherein the ablating the pinhole defect moves the laser beam to follow approximately a periphery of the pinhole defect.

6. The method as claimed in claim 1, wherein a wavelength of the laser beam is adapted so that the laser beam is absorbed by layers forming the active system and transmitted through the first and second substrates.

7. The method as claimed in claim 1, wherein the ablating the pinhole defect is carried out through the first substrate.

8. The method as claimed in claim 1, wherein ablating the pinhole defect is carried out through the second substrate.

9. The method as claimed in claim 1, further comprising pinpointing the pinhole defect using at least a first laser beam pulse.

10. The method as claimed in claim 9, wherein the pinpointing incorporates resetting the laser beam according to a deviation between the at least first pulse and the pinhole defect.

11. The method as claimed in either of claim 10, wherein the pinpointing is carried out using a lower power level of the laser beam than during the ablating.

12. A glazing comprising:

at least one of an electrochemical device or an electrically controllable system of glazing type with variable optical and/or energy properties, of a photovoltaic device or within an electroluminescent device, the electrochemical device being inserted between two electrodes positioned on either side, the electrochemical device including a pinhole defect ablated at its peripheral region, wherein a value of leakage current is reduced by a factor of 10 at a core of margination of the glazing.

* * * * *